(12) United States Patent
Bohno

(10) Patent No.: US 8,504,868 B2
(45) Date of Patent: Aug. 6, 2013

(54) COMPUTER SYSTEM WITH SYNCHRONIZATION/DESYNCHRONIZATION CONTROLLER

(75) Inventor: Yutaka Bohno, Osaka (JP)

(73) Assignee: Panasonic Corporation, Osaka (JP)

( * ) Notice: Subject to any disclaimer, the term of this patent is extended or adjusted under 35 U.S.C. 154(b) by 156 days.

(21) Appl. No.: 13/049,249

(22) Filed: Mar. 16, 2011

(65) Prior Publication Data

US 2011/0167292 A1 Jul. 7, 2011

Related U.S. Application Data

(63) Continuation of application No. PCT/JP2009/001782, filed on Apr. 17, 2009.

(30) Foreign Application Priority Data

Nov. 10, 2008 (JP) .................................. 2008-287518

(51) Int. Cl.
*G06F 15/00* (2006.01)
(52) U.S. Cl.
USPC ........... 713/600; 713/400; 713/401; 713/500; 713/501; 713/502; 713/503; 713/601

(58) Field of Classification Search
USPC .................. 713/400, 401, 500–503, 600, 601
See application file for complete search history.

(56) References Cited

U.S. PATENT DOCUMENTS

| 4,095,267 A | 6/1978 | Morimoto |
| 5,794,019 A | 8/1998 | Genduso et al. |
| 2002/0194446 A1 | 12/2002 | Takeda |

FOREIGN PATENT DOCUMENTS

| JP | 53-119638 A | 10/1978 |
| JP | 61-059563 A | 3/1986 |
| JP | 04-065746 | 3/1992 |
| JP | 10-222243 | 8/1998 |
| JP | 11-039257 A | 2/1999 |
| JP | 2000-347989 | 12/2000 |

*Primary Examiner* — M Elamin
(74) *Attorney, Agent, or Firm* — McDermott Will & Emery LLP

(57) ABSTRACT

A computer system includes a processor, a submodule connected to the processor, an external access monitor configured to monitor a data transfer between the processor and the submodule, and a synchronization/desynchronization controller configured to synchronize or desynchronize the clock of the processor with respect to the clock of the submodule, depending on the result of the monitoring. Specifically, the processor clock is synchronized to the submodule clock when the frequency of access to the submodule by the processor is high, and the processor clock is desynchronized with respect to the submodule clock when the access frequency is low.

11 Claims, 12 Drawing Sheets

COMPUTER SYSTEM WITH SYNCHRONIZATION/DESYNCHRONIZATION CONTROLLER

CROSS-REFERENCE TO RELATED APPLICATIONS

This is a continuation of PCT International Application PCT/JP2009/001782 filed on Apr. 17, 2009, which claims priority to Japanese Patent Application No. 2008-287518 filed on Nov. 10, 2008. The disclosures of these applications including the specifications, the drawings, and the claims are hereby incorporated by reference in their entirety.

BACKGROUND

The present disclosure relates to computer systems having a function of synchronizing or desynchronizing the clock of a processor and the clock of a submodule, such as a bus, a memory, etc.

At present, many processors have a clock which is designed to be synchronized to the clock of a submodule, such as a bus, a memory, etc. In this case, the clock of the processor needs to be fixed to a frequency which is an integer multiple of the frequency of the clock of the submodule. Therefore, in some cases, the processor cannot operate at its maximum operating frequency. For example, when the maximum operating frequency of a processor is 350 MHz and the maximum operating frequency of a bus is 100 MHz, then if the clock of the processor is designed to be synchronized to the clock of the bus, the operating frequency of the processor needs to be set to 300 MHz. Also, when the frequency of a processor clock is decreased to reduce power consumption, then if the design for synchronization and the operating frequency of a bus are not changed, the frequency of the processor clock can be selected only from 100 MHz and 200 MHz, i.e., the clock frequency cannot be more finely selected (e.g., 250 MHz etc.).

There is a known asynchronous circuit design which solves such a problem. In the asynchronous circuit design, data is transferred between a processor and a submodule which are independent of and asynchronous to each other, and the clock frequency of one of the processor and the submodule does not need to be an integer multiple of the clock frequency of the other. Therefore, the processor and the submodule process data transfer therebetween while operating at independent clock cycles.

In a data transfer between the processor and the submodule using the asynchronous clocks, the latency increases due to measures for a metastable state compared to the design for synchronization. The increase of the latency may lead to a degradation in data transfer performance.

There is a known computer system having a synchronization/desynchronization controller which solves such a problem. According to this technique, when data is transferred between a processor and a submodule, the clock of the processor is momentarily synchronized to the clock of the submodule. After the completion of the data transfer, synchronization is disabled, and the processor clock operates asynchronously with respect to the submodule clock (see U.S. Pat. No. 5,794,019).

SUMMARY

In the conventional computer system, however, the processor clock needs to be transitioned to operate synchronously with the submodule clock every time a data transfer is performed between the processor and the submodule. For example, when a data transfer between the processor and the submodule is not continuous (e.g., single transfers), the processor clock is switched from the asynchronous mode to the synchronous mode before the start of a single data transfer, and immediately after the completion of the single data transfer, the processor clock is switched from the synchronous mode to the asynchronous mode.

When the number of data transfers between the processor and the submodule is small, the switching of the processor clock from the asynchronous mode to the synchronous mode and from the synchronous mode to the asynchronous mode requires a longer time than the increase in the latency of a data transfer between the asynchronous processor and submodule. As a result, the advantage of the synchronization of the processor and the submodule may no longer be obtained, or the data transfer performance is further degraded than when the processor and the submodule operate asynchronously.

The present disclosure describes implementations of a computer system having a synchronization/desynchronization controller with which the degradation in data transfer performance due to asynchronous clocks can be reduced, regardless of the number of data transfers.

A first example computer system according to the present disclosure includes a processor, a submodule connected to the processor, an external access monitor configured to monitor a data transfer between the processor and the submodule, and a synchronization/desynchronization controller configured to synchronize or desynchronize a clock of the processor with respect to a clock of the submodule, depending on a result of the monitoring by the external access monitor. The external access monitor includes an access measurer configured to measure the number of accesses per predetermined period between the processor and the submodule, and a comparator configured to compare a result of the measurement by the access measurer with a predetermined count value. The synchronization/desynchronization controller, when a result of the comparison with the predetermined count value by the comparator indicates that the number of accesses per predetermined period is the predetermined count value or more, synchronizes the clock of the processor to the clock of the submodule, and when the result of the comparison with the predetermined count value by the comparator indicates that the number of accesses per predetermined period is less than the predetermined count value, desynchronizes the clock of the processor with respect to the clock of the submodule.

A second example computer system according to the present disclosure includes a processor, a submodule connected to the processor, a command analyzer configured to analyze a command issued by the processor, and a synchronization/desynchronization controller configured to synchronize or desynchronize the clock of the processor with respect to the clock of the submodule, depending on a result of the analysis by the command analyzer.

A third example computer system according to the present disclosure includes a processor, a submodule connected to the processor, an address analyzer configured to analyze an address indicating an access destination of the processor, and a synchronization/desynchronization controller configured to synchronize or desynchronize the clock of the processor with respect to the clock of the submodule, depending on a result of the analysis by the address analyzer.

According to the first example computer system of the present disclosure, a data transfer between the processor and the submodule is monitored. Therefore, advantageously, the processor clock can be synchronized or desynchronized with respect to the submodule clock, depending on the frequency of data transfers, whereby the degradation in data transfer performance due to asynchronous clocks can be reduced.

According to the second example computer system of the present disclosure, a command issued by the processor is analyzed. Therefore, advantageously, it can be determined whether or not the processor clock should be synchronized or desynchronized with respect to the submodule clock, before a data transfer is performed between the processor and the submodule, whereby the degradation in data transfer performance due to asynchronous clocks can be further reduced.

According to the third example computer system of the present disclosure, an address at which the processor accesses the submodule is analyzed. Therefore, advantageously, the processor clock can be synchronized or desynchronized with respect to the submodule clock, depending on the address at which the processor accesses the submodule.

DETAILED DESCRIPTION

Computer systems having a synchronization/desynchronization controller according to embodiments of the present disclosure will be described hereinafter with reference to the accompanying drawings.

First Embodiment

Figure 1:
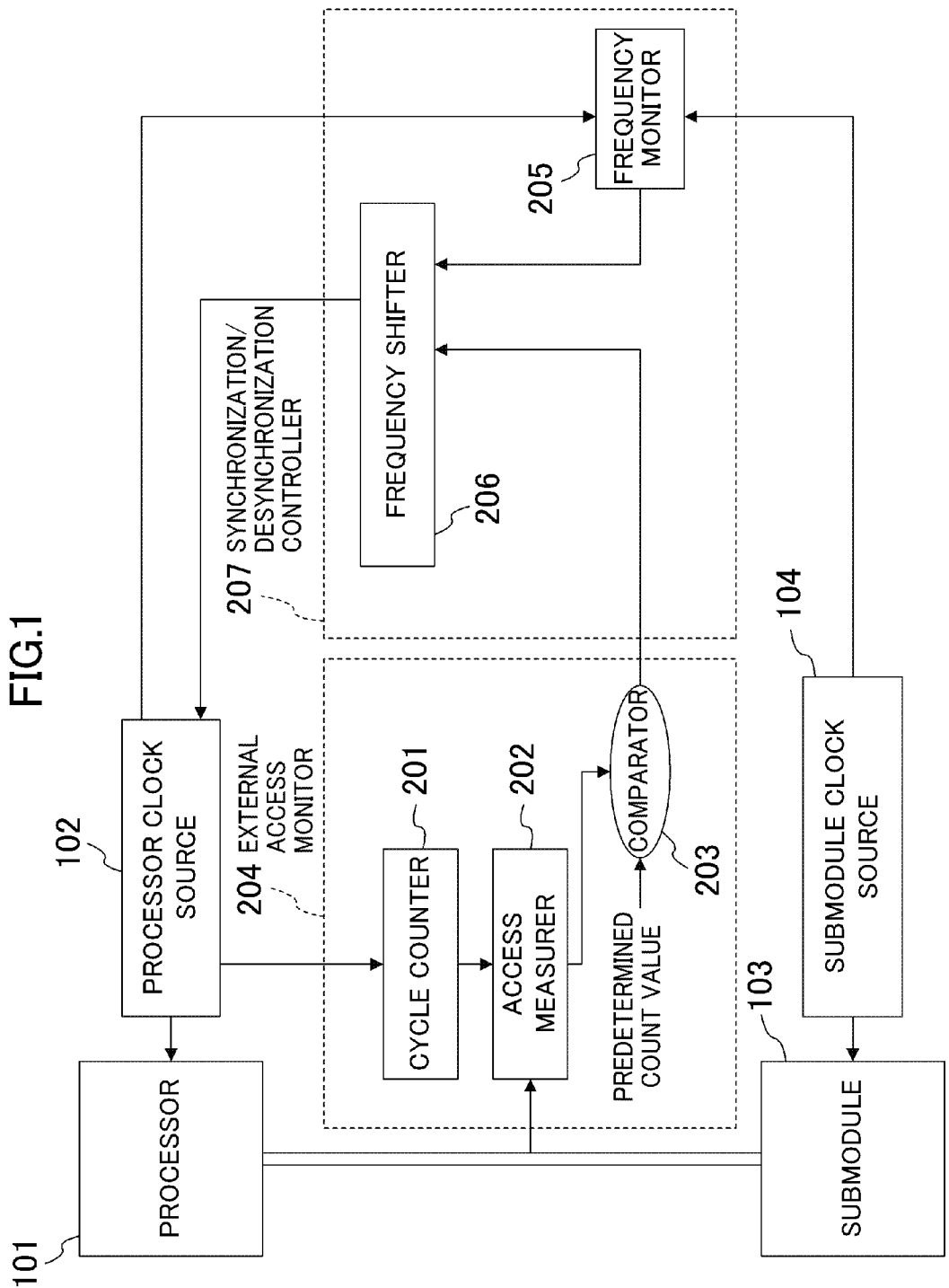
FIG. 1 is a diagram showing a configuration of a computer system according to a first embodiment of the present disclosure.

FIG. 1 is a diagram showing a configuration of a computer system according to a first embodiment. In FIG. 1, the computer system includes a processor 101, and a processor clock source 102 which supplies a clock to the processor 101. The computer system also includes a submodule 103, such as a bus, a memory, etc., and a submodule clock source 104 which supplies a clock to the submodule 103. The computer system also includes an external access monitor 204 and a synchronization/desynchronization controller 207. The external access monitor 204 includes a cycle counter 201 which counts the number of cycles of the processor clock, an access measurer 202 which measures the number of accesses to the submodule 103 by the processor 101, and a comparator 203 which compares a measured value of the number of accesses (access measurement value) with a predetermined count value. The synchronization/desynchronization controller 207 includes a frequency monitor 205 which monitors the frequencies of the processor clock and the submodule clock, and a frequency shifter 206 which shifts the frequency of the processor clock.

Figure 2:
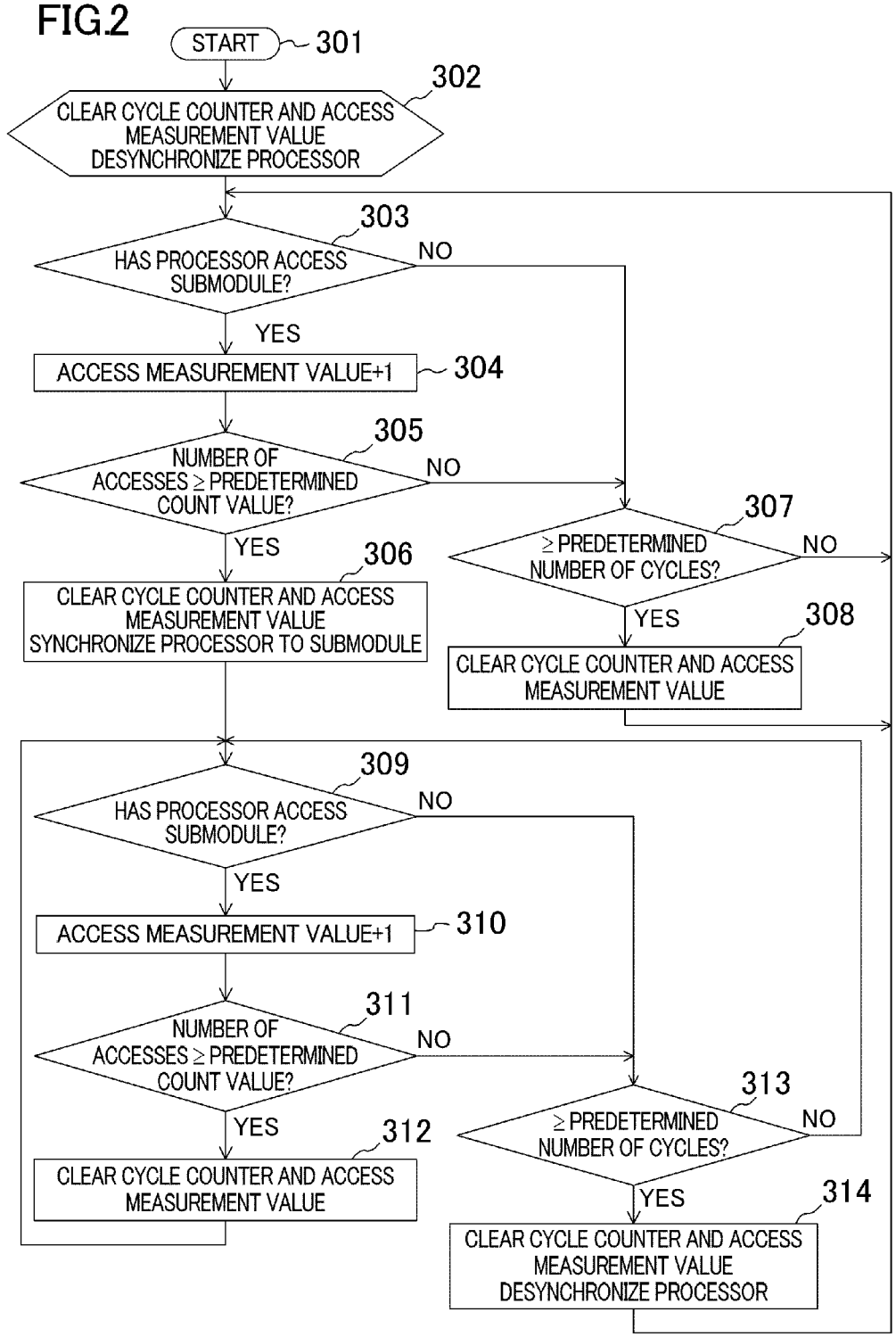
FIG. 2 is a flowchart showing synchronous/asynchronous mode transition operation in the first embodiment.

FIG. 2 is a flowchart of the computer system of the first embodiment. In FIG. 2, in step 301, the processor 101 is activated or started. Next, control proceeds to step 302 in which the cycle counter value and the access measurement value are cleared, and the processor 101 is caused to operate asynchronously with respect to the submodule 103. Next, control proceeds to step 303 in which it is determined whether or not the processor 101 has accessed the submodule 103. When the processor 101 has accessed the submodule 103, control proceeds to step 304 in which the access measurer 202 adds one to the access measurement value. Next, control proceeds to step 305 in which the comparator 203 determines whether or not the access measurement value is a predetermined count value or more. When the access measurement value is the predetermined count value or more, control proceeds to step 306 in which the cycle counter value and the access measurement value are cleared, and the processor clock is synchronized to the submodule clock. If the determination is negative in step 303 or 305, control proceeds to step 307 in which it is determined whether or not the cycle counter value is a predetermined number of cycles or more. When the cycle counter value is the predetermined number of cycles or more, control proceeds to step 308 in which the cycle counter value and the access measurement value are cleared, and then control proceeds to step 303. If the determination is negative in step 307, control proceeds directly to step 303.

After the processor clock is synchronized to the submodule clock in step 306, control proceeds to step 309 in which it is determined as in step 303 whether or not the processor 101 has accessed the submodule 103. When the processor 101 has accessed the submodule 103, control proceeds to step 310 in which the access measurer 202 adds one to the access measurement value. Next, control proceeds to step 311 in which the comparator 203 determines whether or not the access measurement value is a predetermined count value or more. When the access measurement value is the predetermined count value or more, control proceeds to step 312 in which the cycle counter value and the access measurement value are cleared, and then control proceeds to step 309. When the determination is negative in step 309 or 311, control proceeds to step 313 in which it is determined whether or not the cycle counter value is a predetermined number of cycles or more. When the cycle counter value is the predetermined number of cycles or more, control proceeds to step 314 in which the cycle counter value and the access measurement value are cleared, and the processor clock is desynchronized with respect to the submodule clock, and then control proceeds to step 303. When the determination is negative in step 313, control proceeds directly to step 309.

According to this embodiment, the processor clock can be synchronized or desynchronized with respect to the submodule clock, depending on the frequency of access to the submodule 103 by the processor 101. Specifically, when the access frequency is high, the processor clock is synchronized to the submodule clock. When the access frequency is low, the processor clock is desynchronized with respect to the submodule clock. The degradation of data transfer performance due to the asynchronous clocks can advantageously be reduced.

Note that the predetermined count value and the predetermined number of cycles of the first embodiment do not need to be fixed, and may be freely set by the user using a setting register etc.

The synchronization/desynchronization control function may be enabled or disabled using a register etc.

The frequency shifter 206 of the first embodiment, when the processor clock is transitioned from the asynchronous mode to the synchronous mode, may shift the frequency of the processor clock to a highest one of the frequencies at which the processor clock can be synchronized to the submodule clock, or one closest to a frequency obtained immediately prior to the transition to the synchronous mode of the frequencies at which the processor clock can be synchronized to the submodule clock. The frequency shifter 206, when the processor clock is transitioned from the synchronous mode to the asynchronous mode, may shift the frequency of the processor clock to a highest one of the frequency at which the processor 101 can operate. Alternatively, a setting register etc. may be prepared, and the frequency of the processor clock may be shifted to a predetermined clock frequency.

Second Embodiment

Figure 3:
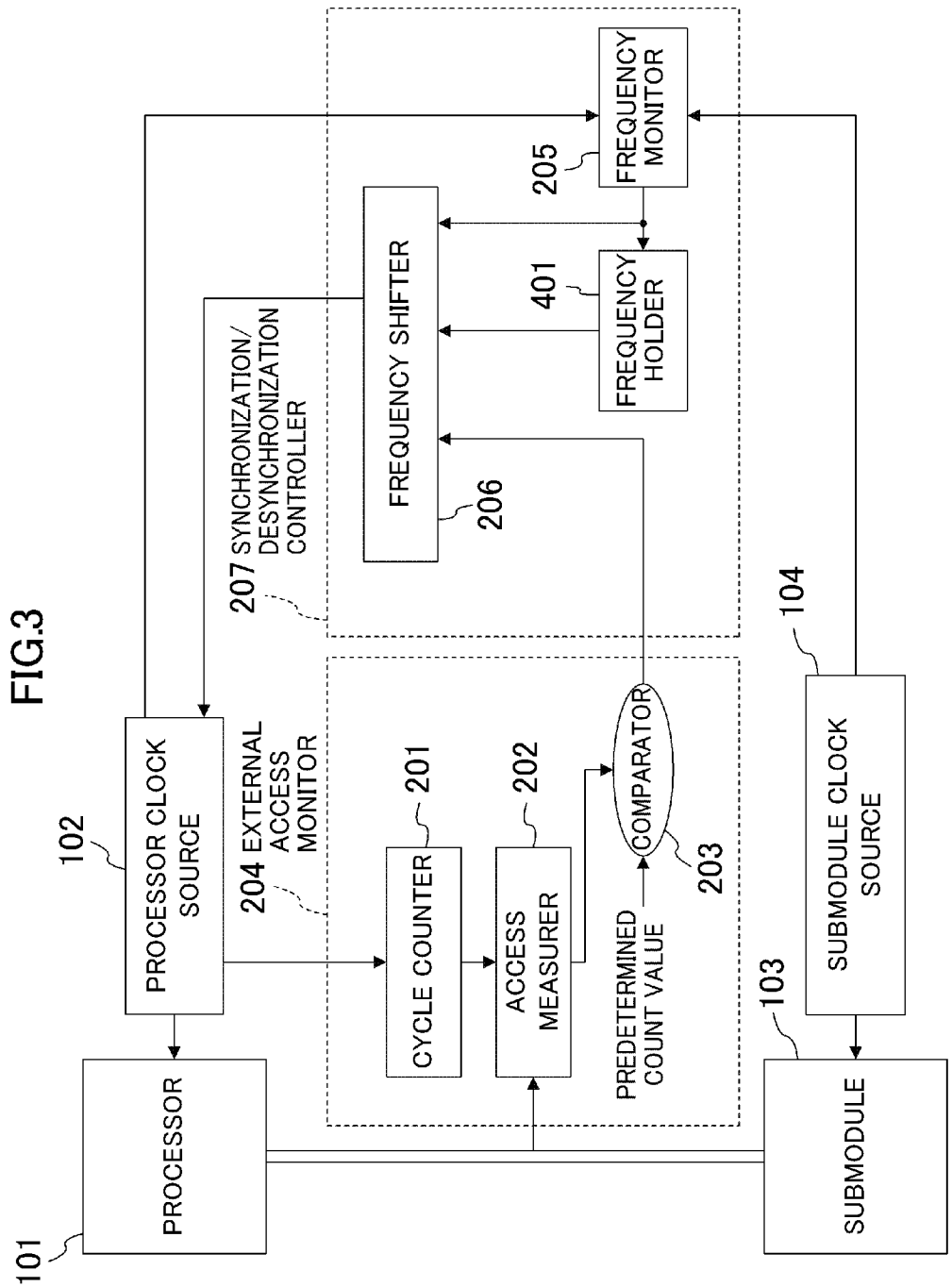
FIG. 3 is a diagram showing a configuration of a computer system according to a second embodiment of the present disclosure.

FIG. 3 is a diagram showing a configuration of a computer system according to a second embodiment, which is similar to that of the computer system of the first embodiment, except that a frequency holder 401 which stores information indicating the frequency of a processor clock is additionally provided.

Figure 4:
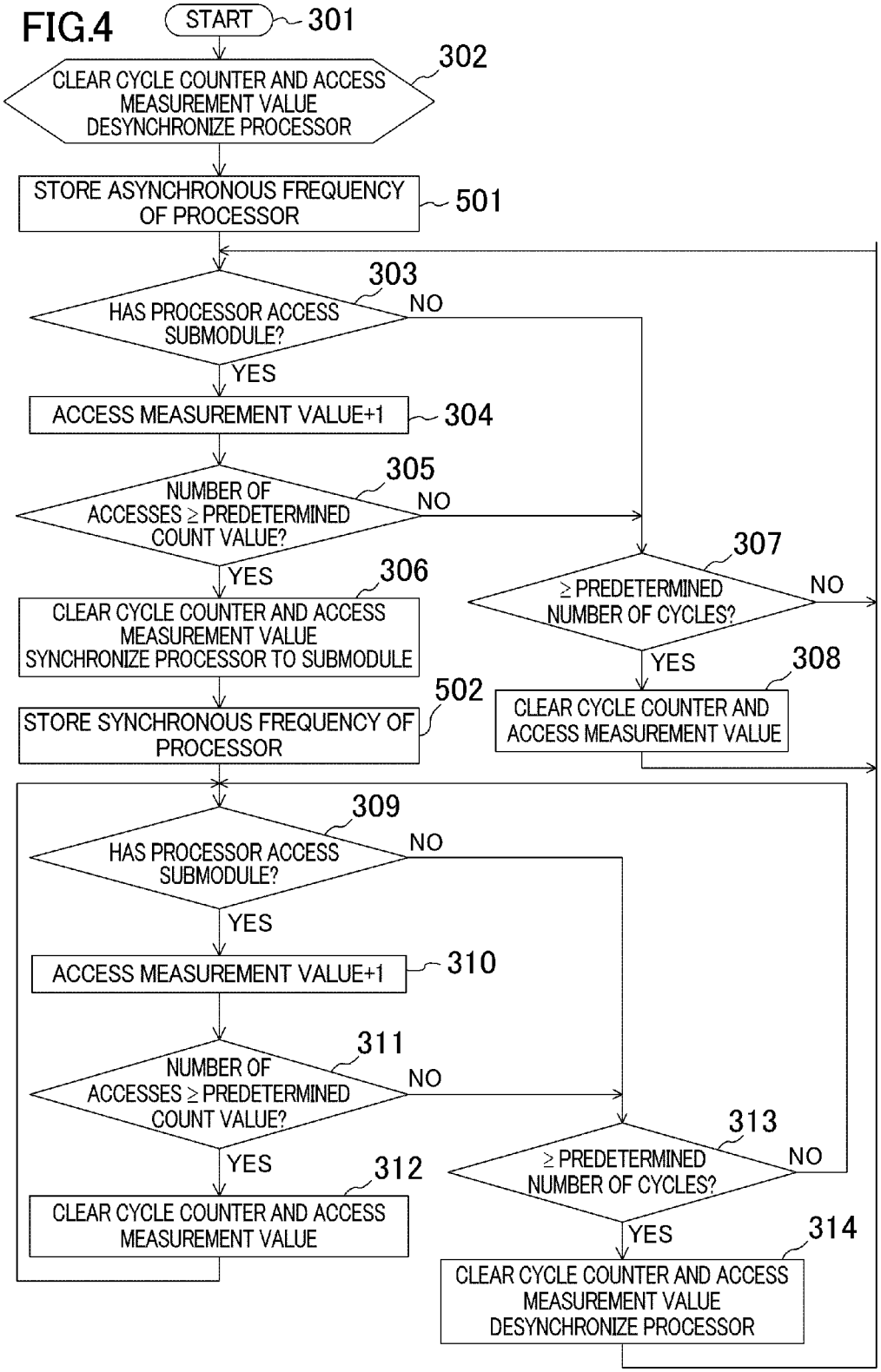
FIG. 4 is a flowchart showing synchronous/asynchronous mode transition operation in the second embodiment.

FIG. 4 is a flowchart of the computer system of the second embodiment, which is similar to that of the first embodiment of FIG. 2, except that steps 501 and 502 are added, and steps 306 and 314 are modified.

In step 302, the processor 101 starts asynchronous operation. Thereafter, control proceeds to step 501 in which the frequency holder 401 stores information indicating the frequency of an asynchronous clock of the processor 101. When the processor clock is subsequently transitioned from the synchronous mode to the asynchronous mode in step 314, the frequency of the processor clock is changed to the asynchronous frequency stored in step 501 using the aforementioned information. Similarly, after the processor clock is transitioned to the synchronous mode in step 306, control proceeds to step 502 in which the frequency holder 401 stores information indicating the frequency of a synchronous clock of the processor 101. When the processor clock is subsequently transitioned from the asynchronous mode to the synchronous mode in step 306 again, the frequency of the processor clock is changed to the synchronous frequency stored in step 502 using the aforementioned information.

According to this embodiment, advantageously, the frequency of the processor clock does not need to be decided by the user, and the processor clock can be automatically synchronized or desynchronized with respect to the submodule clock. Note that, of course, the frequency of the processor clock may be changed to a frequency which is arbitrarily set by the user.

Note that when the processor clock is transitioned from the asynchronous mode to the synchronous mode at the first time, no synchronous frequency has been stored in step 306, and therefore, as in the first embodiment, the frequency of the processor clock is changed to any frequency that is synchronous with the frequency of the submodule clock.

Third Embodiment

Figure 5:
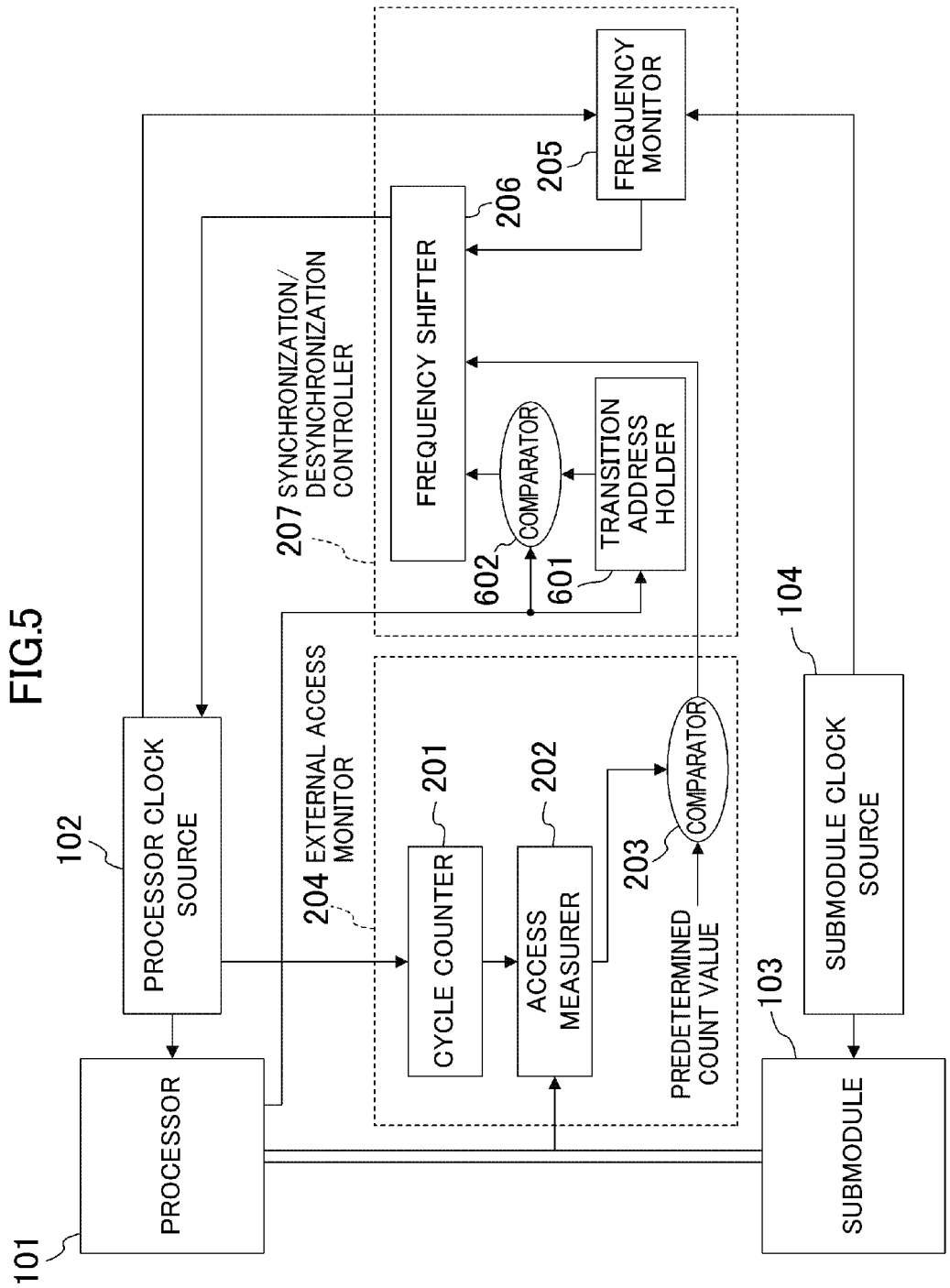
FIG. 5 is a diagram showing a configuration of a computer system according to a third embodiment of the present disclosure.

FIG. 5 is a diagram showing a configuration of a computer system according to a third embodiment, which is similar to that of the computer system of the first embodiment, except that a transition address holder 601, and a comparator 602 which compares an execution address of the processor 101 with an address stored in the transition address holder 601, are additionally provided.

Figure 6:
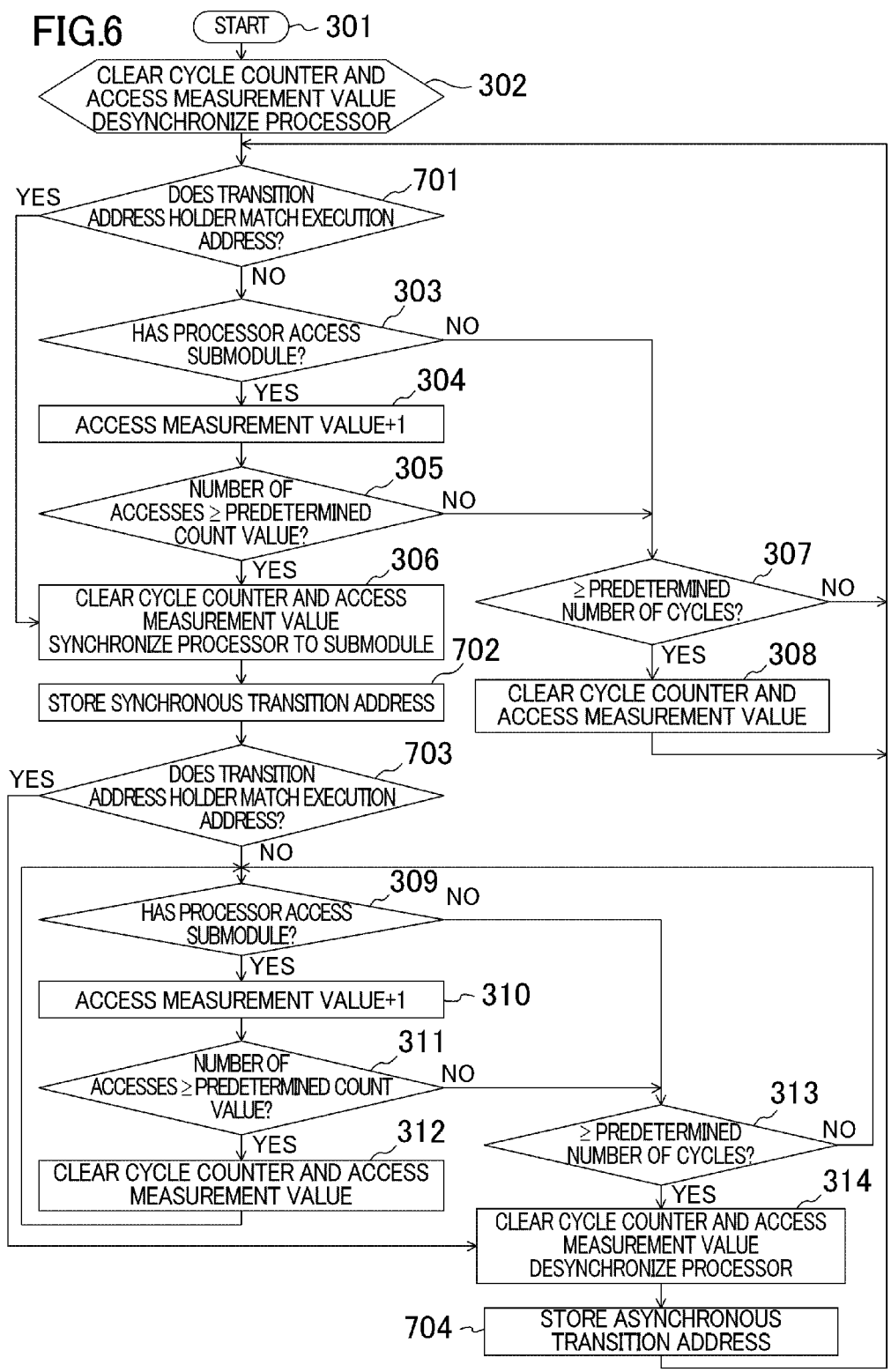
FIG. 6 is a flowchart showing synchronous/asynchronous mode transition operation in the third embodiment.

FIG. 6 is a flowchart of the computer system of the third embodiment, which is similar to that of the first embodiment of FIG. 2, except that steps 701, 702, 703, and 704 are additionally provided.

In step 302, the processor 101 starts asynchronous operation. Thereafter, control proceeds to step 701 in which the comparator 602 compares a synchronous transition address which has been stored in the transition address holder 601 since the previous transition of the processor clock from the asynchronous mode to the synchronous mode, with the execution address to determine whether or not these addresses match each other. At the first time, the transition address holder 601 does not store an address value, and therefore, control proceeds to step 303.

In step 306, the processor clock is transitioned from the asynchronous mode to the synchronous mode. Thereafter, control proceeds to step 702 in which an execution address when the processor clock was transitioned from the asynchronous mode to the synchronous mode is stored as a synchronous transition address into the transition address holder 601.

When control proceeds to step 701 at the second time and thereafter, then if the address stored in step 702 matches the execution address, control then proceeds to step 306.

After the execution address when the processor clock was transitioned from the asynchronous mode to the synchronous mode is stored into the transition address holder 601 in step 702, control proceeds to step 703 in which the comparator 602 compares an asynchronous transition address which has been stored in the transition address holder 601 since the previous transition of the processor clock from the synchronous mode to the asynchronous mode, with the execution address to determine whether or not these addresses match each other. At the first time, the transition address holder 601 does not store an address value, control proceeds to step 309.

After the processor clock is transitioned from the synchronous mode to the asynchronous mode in step 314, control proceeds to step 704 in which an execution address when the processor clock was transitioned from the synchronous mode to the asynchronous mode is stored as an asynchronous transition address into the transition address holder 601.

When control proceeds to step 703 at the second time and thereafter, then if the address stored in step 704 matches the execution address, control then proceeds to step 314.

According to this embodiment, an address at which the processor clock is synchronized or desynchronized with respect to the submodule clock is previously known, the processor clock can be synchronized or desynchronized with respect to the submodule clock prior to an actual data transfer, whereby the degradation in data transfer performance due to the asynchronous clocks can advantageously be further reduced.

Note that the transition address holder 601 of the third embodiment is used to indicate whether an address is of synchronous transition or asynchronous transition. Separate transition address holders may be provided to store a synchronous transition address and an asynchronous transition address separately. The transition address holder 601 may have a capacity to store at least one address.

Fourth Embodiment

Figure 7:
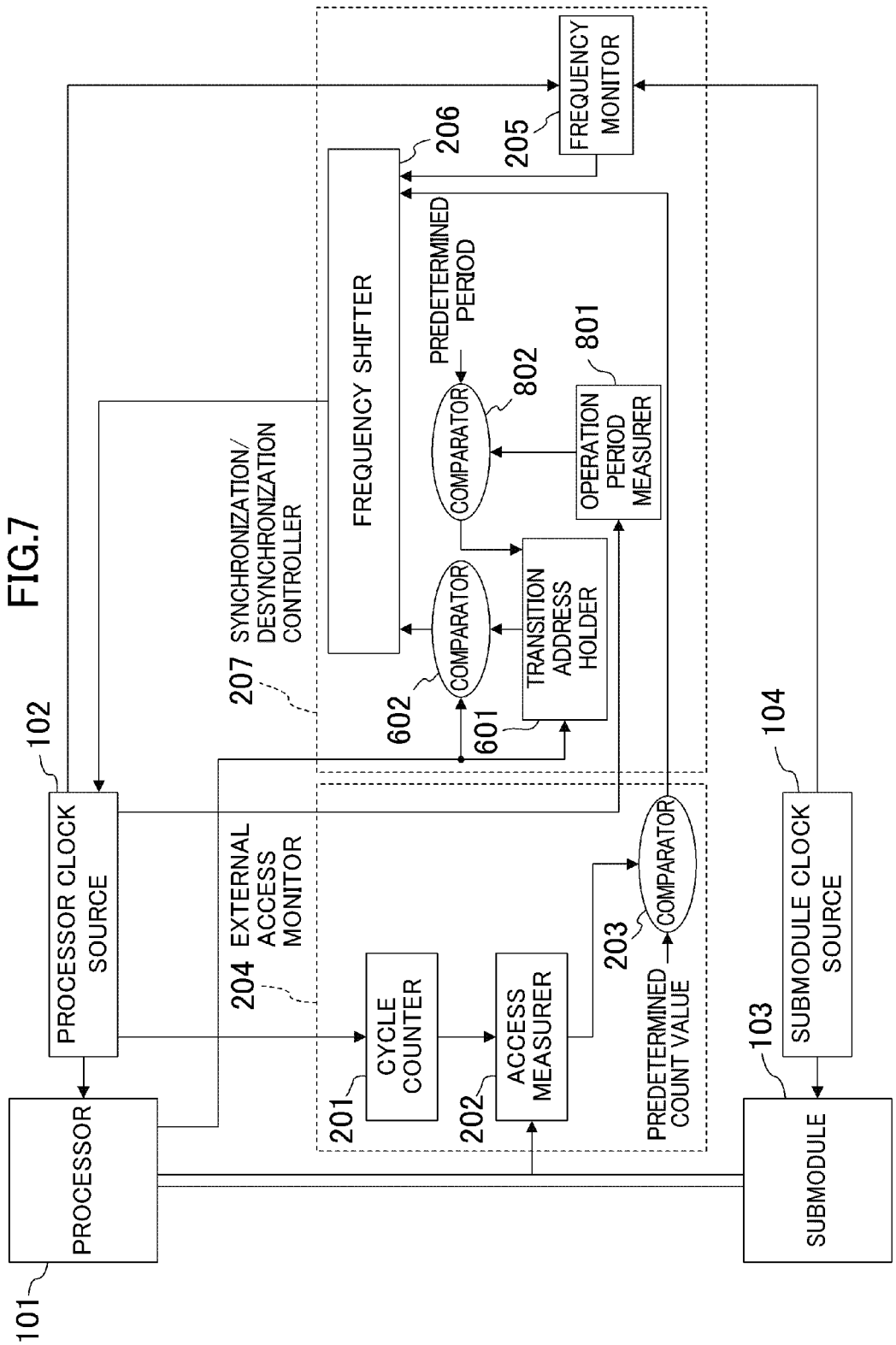
FIG. 7 is a diagram showing a configuration of a computer system according to a fourth embodiment of the present disclosure.

FIG. 7 is a diagram showing a configuration of a computer system according to a fourth embodiment, which is similar to that of the third embodiment, except that an operation period measurer 801 which measures a synchronous/asynchronous operation period of the clock of the processor 101, i.e., a period of time from when the processor clock is synchronized or desynchronized with respect to the submodule clock to when the processor clock is next desynchronized or synchronized to the submodule clock, and a comparator 802 which compares the period measured by the operation period measurer 801 with a predetermined period.

Figure 8:
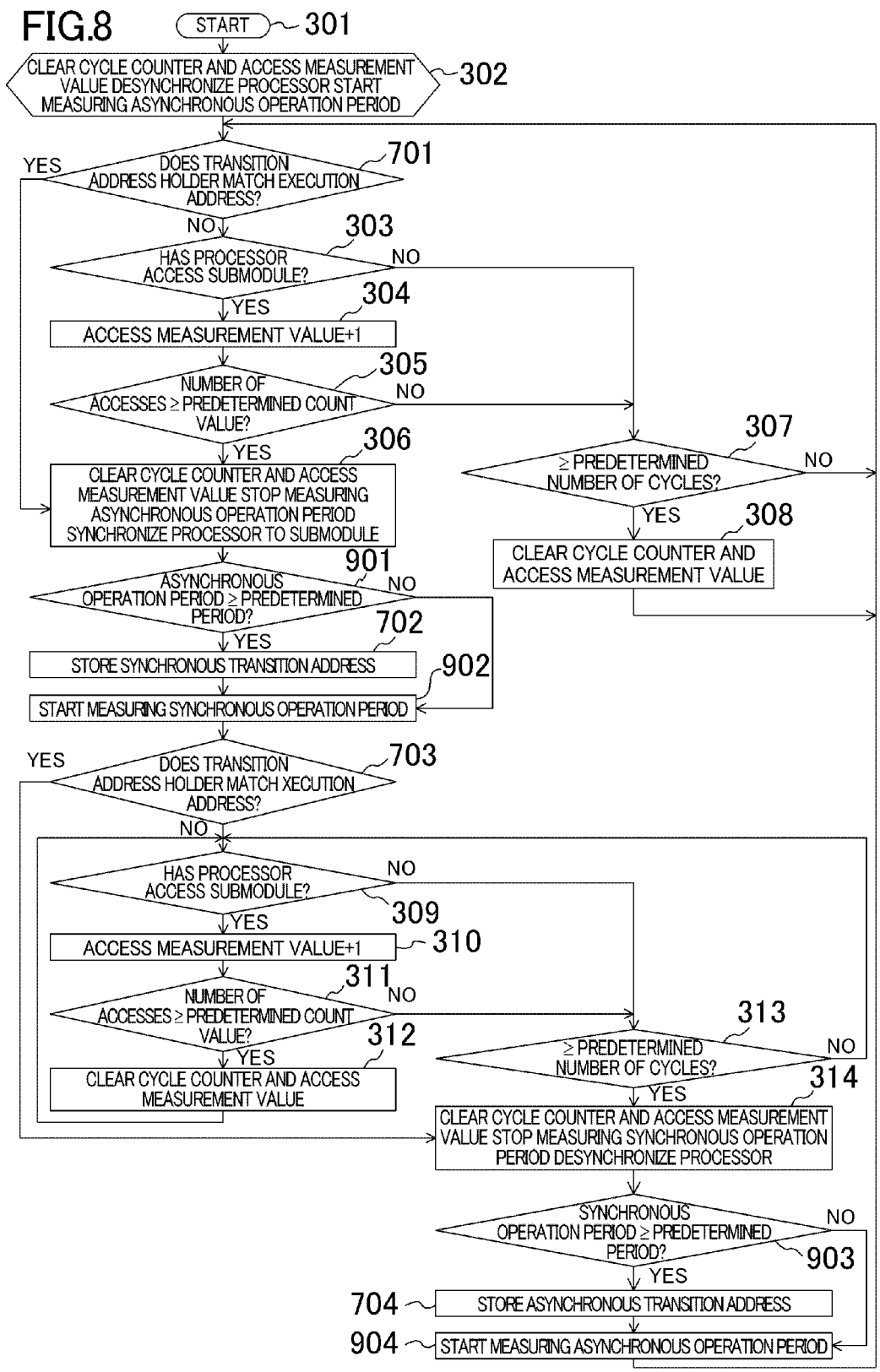
FIG. 8 is a flowchart showing synchronous/asynchronous mode transition operation in the fourth embodiment.

FIG. 8 is a flowchart of the computer system of the fourth embodiment, which is similar to that of the third embodiment of FIG. 6, except that steps 901, 902, 903, and 904 are additionally provided, and steps 302, 306, and 314 are modified.

In step 302, when the processor 101 starts asynchronous operation, the operation period measurer 801 starts measuring an asynchronous operation period. In step 306, the cycle counter value and the access measurement value are cleared, the processor clock is transitioned from the asynchronous mode to the synchronous mode with respect to the submodule clock, and the operation period measurer 801 ends the measurement of the asynchronous operation period. Next, control proceeds to step 901 in which it is determined whether or not the asynchronous operation period is a predetermined period or more. If the asynchronous operation period is the predetermined period or more, control proceeds to step 702 in which the transition address holder 601 stores an execution address at which the processor clock was transitioned from the asynchronous mode to the synchronous mode. Next, control proceeds to step 902 in which the operation period measurer 801 starts measuring a synchronous operation period.

When the determination is negative in step 901, the transition address holder 601 does not store the execution address at which the processor clock was transitioned from the asynchronous mode to the synchronous mode. Thereafter, control proceeds to step 902 in which the operation period measurer 801 starts measuring a synchronous operation period.

Similar operation is performed when the processor clock is transitioned from the synchronous mode to the asynchronous mode. Specifically, in step 314, the cycle counter value and the access measurement value are cleared, and the processor clock is transitioned from the synchronous mode to the asynchronous mode with respect to the submodule clock, and the measurement of the synchronous operation period is ended. Next, control proceeds to step 903 in which it is determined whether or not the synchronous operation period is a predetermined period or more. If the synchronous operation period is the predetermined period or more, control proceeds to step 704 in which the transition address holder 601 stores an execution address at which the processor clock was transitioned from the synchronous mode to the asynchronous mode. Next, control proceeds to step 904 in which the operation period measurer 801 starts measuring an asynchronous operation period.

If the determination is negative in step 903, the transition address holder 601 does not store the execution address at which the processor clock was transitioned from the synchronous mode to the asynchronous mode, and control proceeds to step 904 in which the operation period measurer 801 starts measuring an asynchronous operation period.

According to this embodiment, only if the result of the measurement by the operation period measurer 801 is longer than the predetermined period, the transition address holder 601 is updated. Therefore, although overhead associated with the transition to the synchronous or asynchronous mode may easily occur when the synchronous or asynchronous operation period is short, a degradation in performance due to the overhead can advantageously be reduced.

Note that the predetermined period of the fourth embodiment do not need to be fixed, and may be freely set by the user using a setting register etc.

Fifth Embodiment

Figure 9:
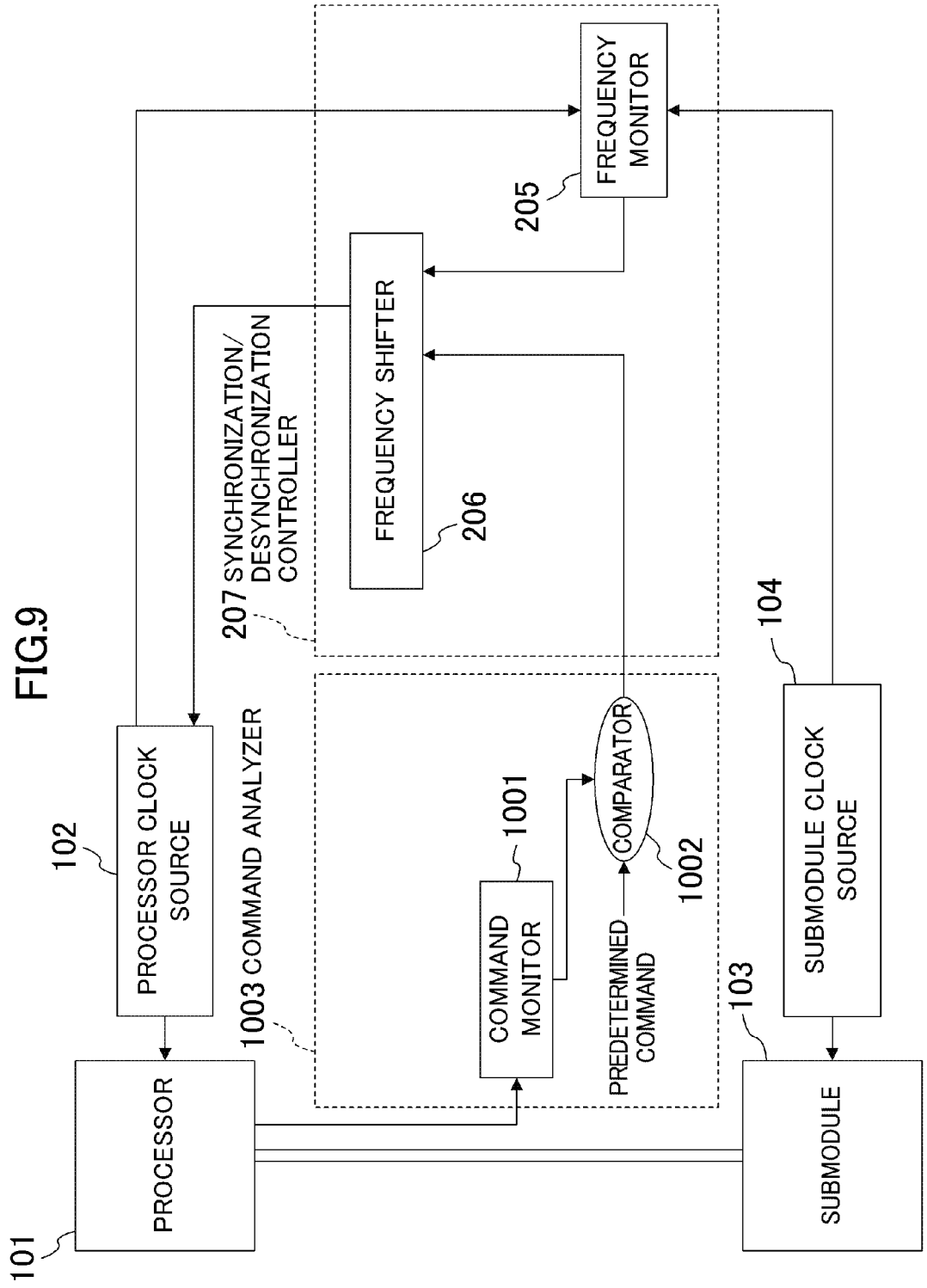
FIG. 9 is a diagram showing a configuration of a computer system according to a fifth embodiment of the present disclosure.

FIG. 9 is a diagram showing a configuration of a computer system according to a fifth embodiment. In FIG. 9, the computer system of the fifth embodiment includes a command analyzer 1003 which has a command monitor 1001 which monitors a command executed by the processor 101, and a comparator 1002 which compares a command obtained by the command monitor 1001 with a predetermined command.

Figure 10:
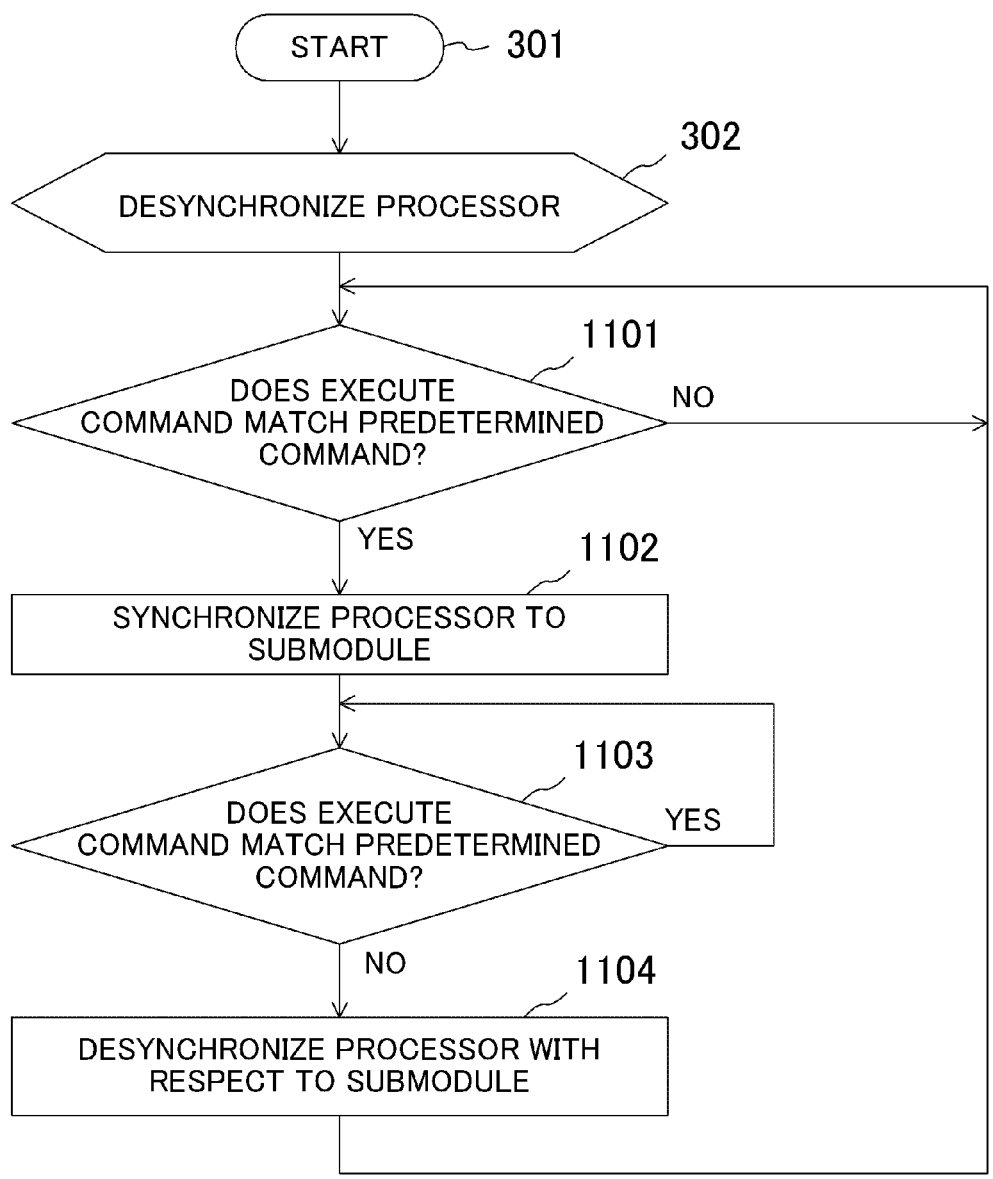
FIG. 10 is a flowchart showing synchronous/asynchronous mode transition operation in the fifth embodiment.

FIG. 10 is a flowchart of the computer system of the fifth embodiment. In step 302, the processor 101 starts asynchronous operation. Thereafter, control proceeds to step 1101 in which the comparator 1002 determines whether or not an execute command for the processor 101 obtained by the command monitor 1001 matches a predetermined command. If the execute command does not match the predetermined command, control returns to step 1101 in order to analyze the next command. If the execute command matches the predetermined command, control proceeds to step 1102 in which the processor clock is synchronized to the submodule clock. Next, in step 1103, it is determined whether or not the execute command matches a predetermined command as in step 1101. If the execute command matches the predetermined command, control returns to step 1103 in order to analyze the next command. If the execute command does not match the predetermined command, control proceeds to step 1104 in which the processor clock is desynchronized with respect to the submodule clock. Next, control proceeds to step 1101 in which the next command is analyzed.

For example, if the command analyzed by the command analyzer 1003 is a load command or a store command, it is preferable that the processor clock should not be synchronized to the submodule clock. If the processor 101 has a cache or a buffer, then when a command to write data stored in the cache or buffer to the submodule 103 is issued, it is preferable that the processor clock should be synchronized to the submodule clock.

According to this embodiment, the processor clock can be synchronized or desynchronized with respect to the submodule clock before the processor 101 accesses the submodule 103, whereby the degradation in performance due to asynchronous operation can advantageously be further reduced.

Note that the predetermined command of the fifth embodiment do not need to be fixed, and may be freely set by the user using a setting register etc.

The synchronization/desynchronization control function may be enabled or disabled using a register etc.

Sixth Embodiment

Figure 11:
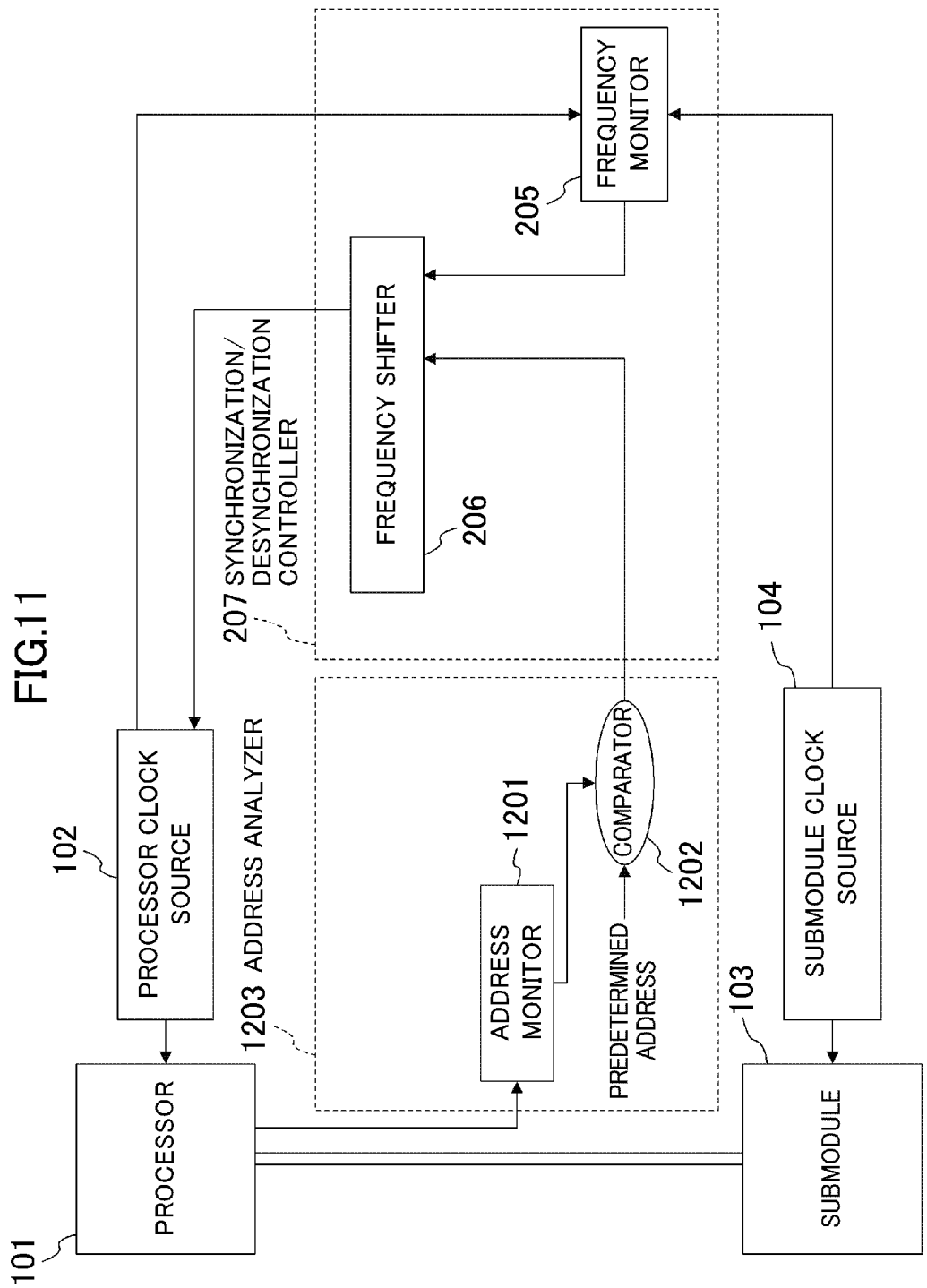
FIG. 11 is a diagram showing a configuration of a computer system according to a sixth embodiment of the present disclosure.

FIG. 11 is a diagram showing a configuration of a computer system according to a sixth embodiment. In FIG. 11, the computer system of the sixth embodiment includes an address analyzer 1203 which has an address monitor 1201 which monitors an address indicating an access destination of the processor 101, and a comparator 1202 which compares an address obtained by the address monitor 1201 with a predetermined address.

Figure 12:
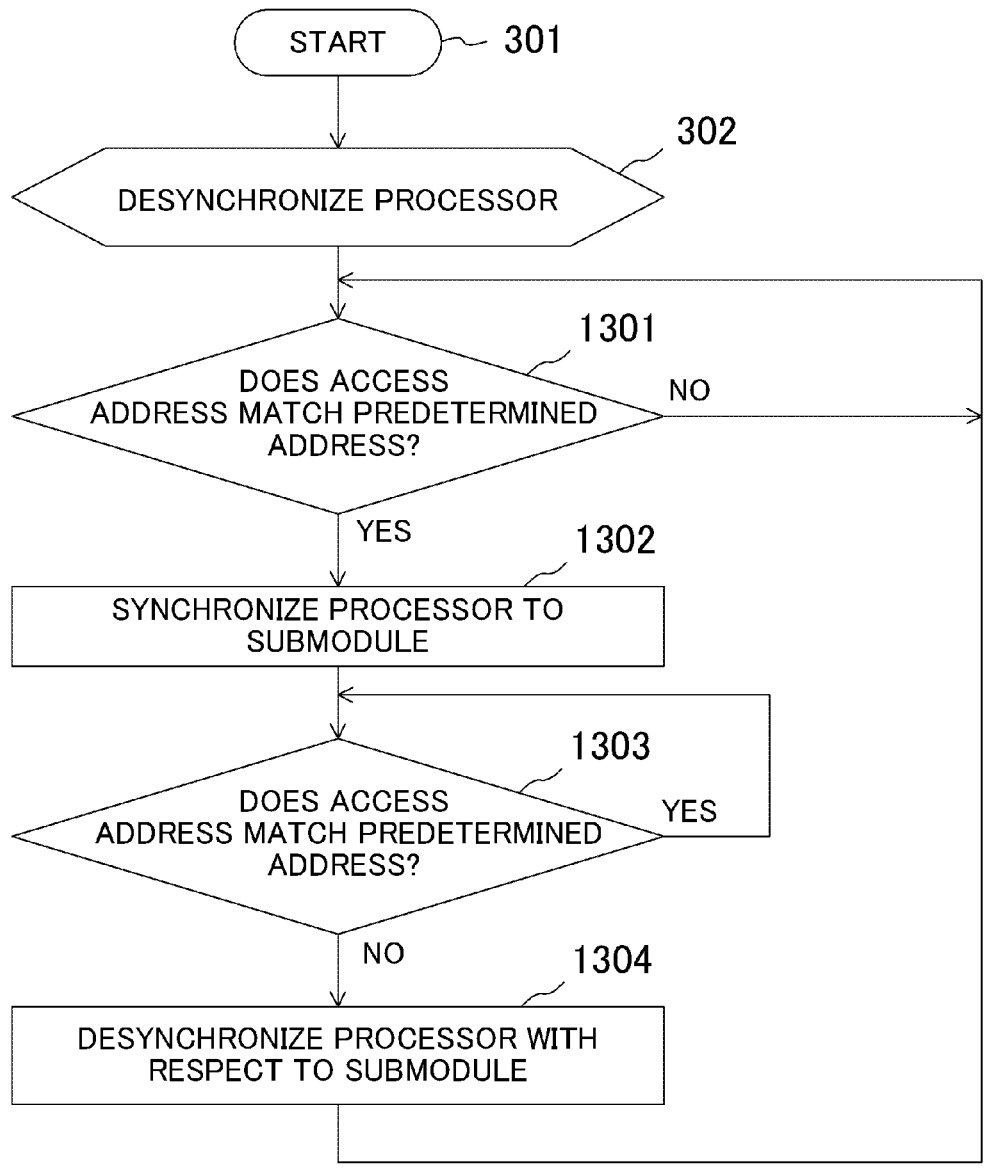
FIG. 12 is a flowchart showing synchronous/asynchronous mode transition operation in the sixth embodiment.

FIG. 12 is a flowchart of the computer system of the sixth embodiment. In step 302, the processor 101 starts asynchronous operation. Thereafter, control proceeds to step 1301 in which the comparator 1202 determines whether or not an access address obtained by the address monitor 1201 matches a predetermined address. If the access address does not match the predetermined address, control returns to step 1301 in order to analyze the next access address. If the access address matches the predetermined address, control proceeds to step 1302 in which the processor clock is synchronized to the submodule clock. Next, control proceeds to step 1303 in which it is determined whether or not the access address matches a predetermined address as in step 1301. If the access address matches the predetermined address, control returns to step 1303 in order to analyze the next access address. If the access address does not match the predetermined address, control proceeds to step 1304 in which the processor clock is desynchronized with respect to the submodule clock. Next, control proceeds to step 1301 in which the next access address is analyzed.

According to this embodiment, the processor clock can advantageously be synchronized or desynchronized with respect to the submodule clock, depending on the address destination at which the processor 101 accesses the submodule 103.

Note that the predetermined address of the sixth embodiment do not need to be fixed, and may be freely set by the user using a setting register etc.

The synchronization/desynchronization control function may be enabled or disabled using a register etc.

The computer system having the synchronization/desynchronization controller of the present disclosure can reduce the degradation in data transfer performance due to asynchronous clocks by using simple hardware, regardless of the frequency of data transfers, and is useful for asynchronous design.

What is claimed is:

1. A computer system comprising:
   a processor;
   a submodule connected to the processor;
   an external access monitor configured to monitor a data transfer between the processor and the submodule; and
   a synchronization/desynchronization controller configured to synchronize or desynchronize a clock of the processor with respect to a clock of the submodule, depending on a result of the monitoring by the external access monitor,
   wherein
   the external access monitor includes
      an access measurer configured to measure the number of accesses per predetermined period between the processor and the submodule, and
      a comparator configured to compare a result of the measurement by the access measurer with a predetermined count value, and
   the synchronization/desynchronization controller, when a result of the comparison with the predetermined count value by the comparator indicates that the number of accesses per predetermined period is the predetermined count value or more, synchronizes the clock of the processor to the clock of the submodule, and when the result of the comparison with the predetermined count value by the comparator indicates that the number of accesses per predetermined period is less than the predetermined count value, desynchronizes the clock of the processor with respect to the clock of the submodule.

2. The computer system of claim 1, wherein
the synchronization/desynchronization controller, when the clock of the processor is transitioned from the asynchronous mode to the synchronous mode with respect to the submodule, sets a frequency of the clock of the processor to a highest one of frequencies at which the clock of the processor is synchronous with the clock of the submodule.

3. The computer system of claim 1, wherein
the synchronization/desynchronization controller, when the clock of the processor is transitioned from the asynchronous mode to the synchronous mode with respect to the submodule, transitions the clock of the processor to one closest to a frequency obtained immediately prior to the transition to the synchronous mode of frequencies at which the clock of the processor is synchronous with the clock of the submodule.

4. The computer system of claim 1, wherein
the synchronization/desynchronization controller, when the clock of the processor is transitioned from the synchronous mode to the asynchronous mode with respect to the submodule, sets a frequency of the clock of the processor to a highest one of frequencies at which the processor can operate.

5. The computer system of claim 1, wherein
the synchronization/desynchronization controller includes a frequency holder configured to store a frequency of the clock of the processor obtained after the transition of the clock of the processor between the synchronous and asynchronous modes, and transitions the clock of the processor to a frequency previously stored in the frequency holder.

6. The computer system of claim 1, wherein
the synchronization/desynchronization controller transitions the clock of the processor to a frequency arbitrarily set by the user.

7. The computer system of claim 1, further comprising:
a section configured to enable or disable a control with respect to the clock of the processor performed by the synchronization/desynchronization controller.

8. The computer system of claim 1, wherein
a period of time during which the number of accesses is measured by the access measurer can be arbitrarily changed by the user.

9. The computer system of claim 1, wherein
the synchronization/desynchronization controller includes a transition address holder configured to store an execution address of the processor obtained after the transition of the clock of the processor between the synchronous and asynchronous modes, and previously synchronizes or desynchronizes the clock of the processor with respect to the clock of the submodule before the processor executes the execution address stored in the transition address holder.

10. The computer system of claim 1, wherein
the synchronization/desynchronization controller includes a transition address holder configured to store an execution address of the processor obtained after the transition of the clock of the processor between the synchronous and asynchronous modes,
an operation period measurer configured to measure a synchronous/asynchronous operation period of the clock of the processor, and a comparator configured to compare a result of the measurement by the operation period measurer with a predetermined period, and when a result of the comparison with the predetermined period by the comparator indicates that an interval between transitions of the clock of the processor is the predetermined period or more, an execution address of the processor is stored into the transition address holder, and when the result of the comparison with the predetermined period by the comparator indicates that the interval between transitions of the clock of the processor is less than the predetermined period, the execution address of the processor is not stored into the transition address holder, and the clock of the processor is previously synchronized or desynchronized with respect to the clock of the submodule before the execution address stored in the transition address is executed by the processor.

11. The computer system of claim 10, wherein
the predetermined period with which the result of the measurement by the operation period measurer is compared can be arbitrarily changed by the user.

* * * * *